United States Patent [19]

Teague et al.

[11] 4,313,732
[45] Feb. 2, 1982

[54] PROCESS FOR IMPROVING WASHFASTNESS OF INDIGO-DYED FABRICS

[75] Inventors: Edward W. Teague, Raleigh; Louis A. Graham; Bobby L. McConnell, both of Greensboro, all of N.C.

[73] Assignee: Burlington Industries, Inc., Greensboro, N.C.

[21] Appl. No.: 212,109

[22] Filed: Dec. 2, 1980

Related U.S. Application Data

[63] Continuation of Ser. No. 202,430, Oct. 30, 1980, abandoned, which is a continuation of Ser. No. 112,499, Jan. 16, 1980, abandoned.

[51] Int. Cl.$^3$ .............................................. C09B 62/00
[52] U.S. Cl. ............................................ 8/541; 8/549; 8/566; 8/584; 8/590; 8/576; 8/606; 8/653; 8/918
[58] Field of Search .................. 8/499, 541, 566, 549, 8/576, 606, 653, 918, 584, 590

[56] References Cited

U.S. PATENT DOCUMENTS

| | | | |
|---|---|---|---|
| 3,454,551 | 7/1969 | Mangini et al. .................. | 260/242.2 |
| 3,685,953 | 8/1972 | Cuvelier ................................... | 8/606 |
| 3,743,477 | 7/1973 | Egli et al. ............................... | 8/480 |
| 3,988,111 | 10/1976 | Balland .................................. | 8/541 |
| 4,035,145 | 7/1977 | Gipp et al. ............................. | 8/606 |

FOREIGN PATENT DOCUMENTS 616138 4/1962 Belgium .
1236882 6/1971 United Kingdom .

OTHER PUBLICATIONS

W. F. Beach, "Fibre-Reactive Dyes", (Logos Press, London), 1970, p. 92.
K. Venkataraman, "The Chemistry of Synthetic Dyes", vol. VI (Academic Press) 1972, pp. 195–198.

*Primary Examiner*—A. Lionel Clingman
*Attorney, Agent, or Firm*—Cushman, Darby & Cushman

[57] ABSTRACT

Dyes are fixed in an indigo-dyed cellulosic fabric, such as denim, in order to improve its washfastness, by applying an aqueous solution of a fixative compound then drying and curing the thus treated fabric in the disclosed process. Suitable fixatives include colorless and colored dihalo-s-triazine reactive dyes. Cellulosic fabrics thus treated retain their original indigo color even after repeated launderings.

9 Claims, No Drawings

PROCESS FOR IMPROVING WASHFASTNESS OF INDIGO-DYED FABRICS

CROSS-REFERENCE TO RELATED APPLICATIONS

This is a continuation of our earlier application Ser. No. 202,430 filed Oct. 30, 1980, now abandoned, which, in turn, is a continuation of our earlier application Ser. No. 112,499 filed Jan. 16, 1980 and now abandoned.

BACKGROUND OF THE INVENTION

The indigo dyeing of cellulosic yarns and fabrics, because of the essentially surface nature of such dyeing, creates a fabric subject to considerable and persistent washdown or loss of color during extended use. For nearly two decades customer preference and acceptance, particularly in denim fabrics such as jeans and overalls, has been highly favorable to the so-called washed-down look. Often the product was actually prewashed several times by fabric or garment manufacturers to produce the much-sought "used" look. In some instances even one or more chlorine bleaches were employed to achieve a greater appearance of use. Today the tide of customer and styling preference has swung toward denims more stable to washing, in either home or commercial washing machines. Not only is more washfastness being sought in jeans and overalls, but denim has been promoted to a high-fashion fabric for use in suitings, slacks, dresses, and the like.

Since high washdown is inherent in indigo-dyed fabrics, a need has thus arisen for such fabrics which are more resistant to washing than any heretofore known. The present invention concerns a method whereby the washfastness of indigo-dyed cellulosic fabrics, more particularly denims, is greatly improved.

DESCRIPTION OF THE INVENTION

We have discovered and hereby disclose a process fixing the dye in indigo-dyed cellulosic fabrics and substantially improving the washfastness of such fabrics by applying a solution of one or more fixative compounds to the fabric, curing the fixative and optionally drying the thus treated fabric. Cellulosic fabrics thus treated exhibit only slight washdown after repeated home or commercial laundering. The process of our invention is particularly directed to denim fabrics.

One or more fixative compounds are applied to the cellulosic substrate usually in the form of an aqueous solution.

The fixative compounds that are used according to the present invention include the following:

1. Colorless dihalo-s-triazines of the general formula:

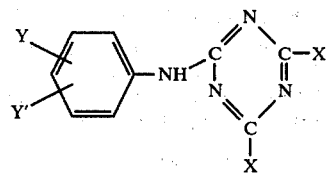

in which Y and Y', which may be the same or different, are solubilizing groups including a phosphonic, phosphoric, carboxylic or preferably a sulfonic group, or one of Y or Y' may be hydrogen, and the sodium salts thereof, and X is bromine, fluorine or preferably chlorine. Suitable 4,6-dihalo-s-triazine-type materials are described in Belgian Pat. No. 616,138 of Oct. 8, 1962, the disclosure of which is hereby incorporated by reference, among which is a preferred compound 2-(p-sulfoanilino)-4,6-dichloro-s-triazine and its sodium salts. Other suitable colorless halo-s-triazines are described in Fiber-Reactive Dyes, W. F. Beech, pp. 92-93, SAF International, Inc., 1970, the disclosure of which is hereby incorporated by reference.

2. Colored dihalo-s-triazines of the general formula:

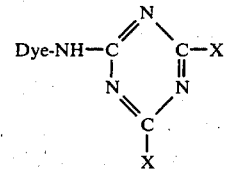

in which X is bromine, fluorine, or preferably chlorine and Dye is a chromophore. These and similar compounds are described in Fiber-Reactive Dyes, Beech, supra.

3. Colored poly (halo-s-triazines) containing from two to four monohalotriazinylamino and/or dihalotriazinylamino groups, in conjunction with from one to two chromophores, such that there are from two to six reactive halogen atoms in the molecule. Such dyes may be represented by the formula:

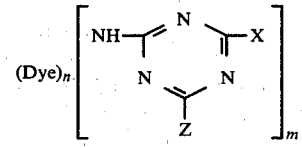

where each Dye, which represents a chromophore, may be terminally or internally bonded to one or more of the triazine rings, that is the chromophore(s) may be at one or both ends or in the middle of the molecule; n is 1 or 2, m is 2 or 3; X is as defined above; and Z is at least one of X, NH, a non-colored bridging link which may be or include another triazine ring, or combinations of two or more of these.

Representative reactive compounds of this type are described in the Chemistry of Synthetic Dyes, Volume 6, K. Venkataraman, p. 195-8, Academic Press, 1972, the disclosure of which is hereby incorporated by reference. Illustrative groups represented by Z in the above general formula include:

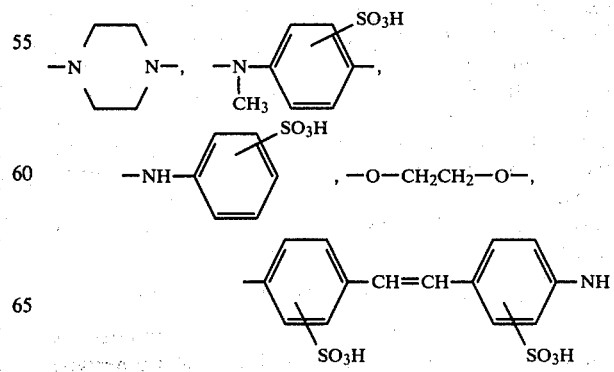

which groups are present in compounds described in detail in one or more of U.K. Patent Specification Nos. 1,015,932; 1,017,271; 1,902,109, French Pat. Nos. 1,329,106; 1,472,770; 1,472,769; Belgian Pat. No. 717,892, Japanese Pat. No. 21,029/67 and U.S. Pat. No. 3,454,551, the disclosures of which are hereby incorporated by reference.

4. Quaternary ammonium compounds of the general formula:

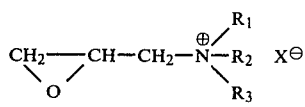

where $R_1$, $R_2$, and $R_3$, which may be the same or different, are $C_1$ to $C_3$ alkyl groups while $X^-$ is an anion selected from halogen, sulfate, nitrate or the like. These compounds are described in U.S. Pat. No. 3,988,111, the disclosure of which is hereby incorporated by reference.

Drying and curing of the processed fabric to complete the fixing operation may be done at any convenient temperature, the requisite dry and cure being a function of the temperature that is used and the residence time of the fabric at that temperature. Drying and/or curing may be accomplished at room temperature over a sufficient period of time. This is generally known in the art as the cold pad-batch process. However, in order to accelerate this process we prefer to operate at temperatures generally within a range of about 150° F. up to about 400° F., although higher and lower temperatures may be used. Preferred temperatures range from 250° F. to 375° F. Typical heating times will vary from one minute up to one hour or so, again depending upon the temperature employed.

Also included in the treatment solution are processing aids of the type customarily used in reactive dyeing processes. One or more wetting agents are often necessary when fixing fabrics or substrates that have been sized or finished in order for the fixative to penetrate the size or coating. This is particularly true of denim fabric which are warp-dyed, sized, the woven with uncolored fill yarns into the denim fabric. Acid fixing agents, such as sodium carbonate, sodium bicarbonate, sodium hydroxide or other alkaline salts, as are used in reactive dyeing, are also included in an amount sufficient to give a pH of from 7.0 to about 12, preferably between 8.0 to 10, to the dyebath.

Cellulosic yarns and fabrics as utilized in the invention include compositions of 100% cotton and of its blends with other fibers, principally polyester.

Finishing as the term is commonly used in the denim art is a process of treating the fabric, after dyeing, with starch and/or polyvinyl alcohol to improve its final characteristics, notably hand, weight, and body. The fixation process may be carried out on indigo-dyed fabric prior to finishing, or on finished fabrics; in either case a wetting agent system is preferably present in the pad bath.

EXAMPLES OF THE INVENTION

The present invention is now further illustrated by the following non-limiting examples. Unless otherwise indicated, all parts and percentages are by weight.

EXAMPLE 1

A pad bath consisting of sodium 2,6-dichloro-s-triazin-4-ylaminobenzene-4-sulfonate (5 grams per liter), $NaHCO_3$ (5 g/l) and a wetting agent consisting of a mixture of nonylphenoxypolyethyleneoxyethanol (nonionic) and sodium sulfosuccinate (anionic) in cool water (5 g/l) was prepared. This bath was padded at ambient temperature onto warp-dyed, unfinished denim fabric with a wet pick-up of 47%. A piece of dyed denim fabric the same size, but untreated, was used as a comparison. The treated and untreated fabrics were then dried at 220° F. and cured 90 seconds at 350° F.

Swatches of the treated and untreated fabrics were washed four times using the AATCC-2A wash procedure, which is equivalent to 5 home launderings. Comparison of the treated versus the untreated fabrics both visually and spectrophotometrically indicated less loss of color or washdown on the treated fabrics, by as much as 20% to 25%.

EXAMPLE 2

The procedure of Example 1 was repeated, this time using 10 g/l of sodium 2,6-dichloro-s-triazin-4-ylaminobenzene-4-sulfonate and 10 g/l of $NaHCO_3$. The results obtained were comparable to those in Example 1.

EXAMPLE 3

The procedure of Example 1 was repeated, this time using 20 g/l of sodium 2,6-dichloro-s-triazin-4-ylaminobenzene-4-sulfonate and 10 g/l of $NaHCO_3$. The results obtained were similar.

EXAMPLE 4

A pad bath consisting of glycidyltrimethylammonium chloride (5 g/l) and $Na_2CO_3$ (5 g/l) was padded on the same type fabric as in Example 1 and processed under the same conditions. The results obtained were again comparable to Example 1.

EXAMPLE 5

Fabric was padded as in Example 4 using the same pad bath. The swatches were dried and cured for five minutes at 300° F. The results were comparable to those in Examples 1 and 4.

EXAMPLE 6

The procedure of Example 4 was repeated, this time using a bath of glycidyltrimethylammonium chloride and $Na_2CO_3$ (10 g/l). The results obtained were comparable to those of Example 4.

EXAMPLE 7

A piece of the same greige fabric used in Example 1, which had been finished with 90% starch and 10% polyvinyl alcohol, was also treated in the manner of Example 1. Again after multiple washes the treated finished fabric and the untreated finished fabric showed that the washdown or color loss was reduced for the fabric treated with the pad bath of Example 1.

EXAMPLE 8

A dye solution was prepared by dissolving Procion Black 2R-PC, CI Reactive Black 41 (10 g/l), $NaHCO_3$ (10 g/l) and a wetting agent comprising a 50:50 mixture of nonylphenoxypolyethyleneoxyethanol (nonionic) and sodium sulfosuccinate (anionic) in cool water. This solution was padded on indigo-dyed denim, dried, and cured for five minutes at 300° F. The fabric was then given three AATCC 2A washes equivalent to fifteen home launderings. There was very little washdown, compared to the control.

EXAMPLE 9

An unfinished denim fabric containing indigo dyed warp yarns and undyed filling yarns was treated with a bath containing:
3 g/l Procion Blue MX-R (Reactive Blue 4, C.I. 61205)
2 g/l sodium 2,6-dichloro-s-triazin-4-ylaminobenzene-4-sulfonate
5 g/l NaHCO$_3$
5 g/l mixture of nonionic and anionic wetting agent When padded with the above bath the pick-up was approximately 47%. The fabric was then dried at 220° F. and cured 90 seconds at 350° F. Extended home launderings (20 HL) showed less washdown than on untreated sample.

EXAMPLE 10

Example 9 was repeated using a pad bath of the following composition:
1 g/l Procion Blue MX-R (Reactive Blue 4, C.I. 61205)
1 g/l Procion Red MX-B (Reactive Red 6, C.I. 17965)
1 g/l Procion Yellow MX-R (Reactive Yellow 4, C.I. 13190)

As in the previous examples, less washdown was observed with a treated sample than with the untreated sample.

The Procion dyes of Examples 8, 9, and 10 are dichloro-s-triazine dyes. Procion is the trademark of Imperial Chemical Industries Limited for their series of reactive dyes.

What is claimed is:

1. A process for fixing indigo dye on a cellulosic fiber substrate to improve the washfastness thereof comprising applying to an indigo-dyed substrate a fixing solution of:

(1) a dihalo-s-triazine of the formula:

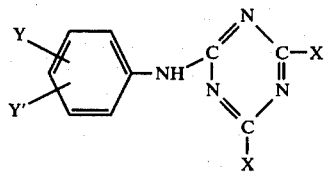

wherein Y and Y' which are the same or different are selected from sulfonic, phosphonic, phosphoric or carboxylic groups, provided that one of Y or Y' may be hydrogen, and X is chlorine, fluorine or bromine;

(2) a dihalo-s-triazine reactive dye of the formula:

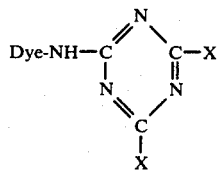

wherein Dye is a chromophore and X is as defined above;

(3) a poly(halo-s-triazine) reactive dye of the formula:

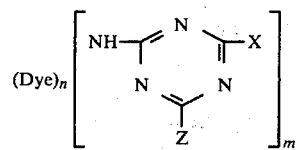

where each Dye, which represents a chromophore, may be terminally or internally bonded to one or more of the triazine rings; n is 1 or 2, m is 2 or 3, X is as defined above; and Z is at least one of X, NH, a non-colored bridging link which may be or include another triazine ring, or combinations of two or more of these:

(4) a quaternary ammonium compound of the formula:

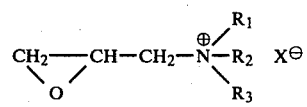

wherein R$_1$, R$_2$, and R$_3$, which are the same or different are C$_1$–C$_3$ alkyl groups and X is as defined above;

(5) mixtures of (1) and (2); or (6) mixtures of (1) and (3);

at a pH of 7.0 to about 12, and thereafter curing the thus treated substrate.

2. The process according to claim 1 including the further step of heating the dried substrate to a temperature of about 220° F. to about 400° F. for a period of time sufficient to dry and cure the treated substrate.

3. The process according to claim 1 wherein the treated substrate is rolled, stored at ambient temperature of about 65° to 90° F., and cured on the roll.

4. The process according to claim 1, 2 or 3 wherein said substrate is a warp-dyed denim fabric.

5. The process according to claim 1 wherein the fixing solution is applied by padding, spraying or rolling onto said substrate.

6. An indigo-dyed blue denim fabric having improved washfastness produced by the process of claim 4.

7. In a process for producing cellulosic fabric containing indigo-dyed cellulosic fibers therein, comprising the steps of indigo dyeing a cellulosic fiber and weaving a portion of the thus dyed fiber into a fabric, the improvement of treating the indigo-dyed fabric to improve the washfastness thereof comprising the steps of:

A. applying a solution of:

(1) a dihalo-s-triazine of the formula:

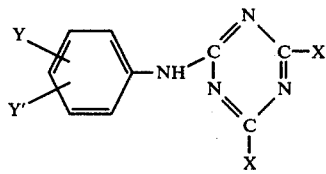

wherein Y and Y' which are the same or different are selected from sulfonic, phosphonic, phosphoric or carboxylic groups, provided that one of Y or Y' may be hydrogen, and X is chlorine, fluorine or bromine;

(2) a dihalo-s-triazine reactive dye of the formula:

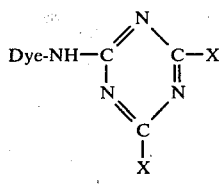

wherein Dye is a chromophone and X is as defined above;

(3) a poly(halo-s-triazine) reactive dye of the formula:

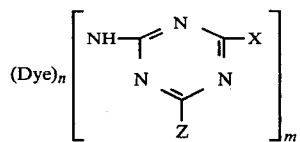

where each Dye, which represents a chromophore, may be terminally or internally bonded to one or more of the triazine rings; n is 1 or 2, m is 2 or 3, X is as defined above; and Z is at least one of X, NH, a non-colored bridging link which may be or include another triazine ring, or combinations of two or more of these:

(4) a quaternary ammonium compound of the formula:

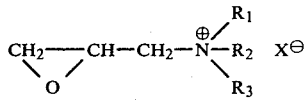

wherein $R_1$, $R_2$, and $R_3$, which are the same or different are $C_1$–$C_3$ alkyl groups and X is as defined above;

(5) mixtures of (1) and (2); or
(6) mixtures of (1) and (3);

at a pH of 7.0 to about 12, to the fabric, and thereafter

B. heating to dry and cure the thus treated fabric.

8. The process according to claim 7 wherein a fabric size is applied prior to step (A).

9. The process according to claim 7 wherein a fabric size is applied after step (A).

* * * * *

UNITED STATES PATENT AND TRADEMARK OFFICE
CERTIFICATE OF CORRECTION

PATENT NO. : 4,313,732
DATED : Feb. 2, 1982
INVENTOR(S) : Teague et al.

It is certified that error appears in the above-identified patent and that said Letters Patent are hereby corrected as shown below:

On the cover sheet

Page 1, [63], after "Continuation" insert --in part--.

Page 2, column 1, line 7, after "continuation" insert --in part--.

Signed and Sealed this

Twentieth Day of July 1982

[SEAL]

Attest:

GERALD J. MOSSINGHOFF

*Attesting Officer*  *Commissioner of Patents and Trademarks*